J. S. HOLLIDAY.
ELECTRIC MOTOR.
APPLICATION FILED JULY 30, 1914.

1,147,170.

Patented July 20, 1915.

WITNESSES

INVENTOR

UNITED STATES PATENT OFFICE.

JOHN S. HOLLIDAY, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

ELECTRIC MOTOR.

1,147,170.   Specification of Letters Patent.   Patented July 20, 1915.

Application filed July 30, 1914. Serial No. 854,066.

*To all whom it may concern:*

Be it known that I, JOHN S. HOLLIDAY, a citizen of the United States, residing at Wilkinsburg, in the county of Allegheny and State of Pennsylvania, have invented certain new and useful Improvements in Electric Motors, of which the following is a specification.

My invention relates to alternating current motors, and particularly to motors which are arranged to be operative by a current of a predetermined frequency and to be inoperative by current of another frequency.

I will describe one form of motor embodying my invention, and then point out the novel features thereof in claims.

Figure 1:
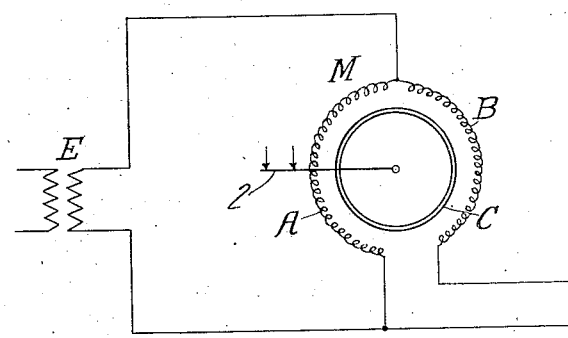
Figure 1:
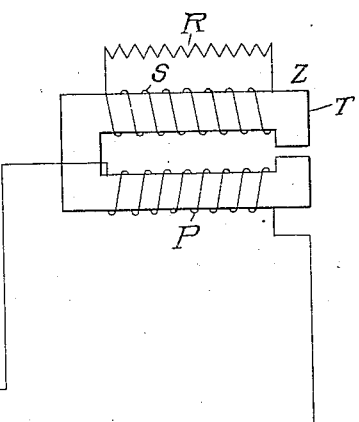
Figure 2:
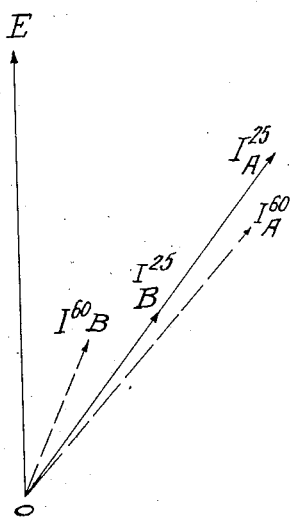

In the accompanying drawing, Figure 1 is a view showing diagrammatically one form of electric motor embodying my invention, and Fig. 2 is a vector diagram showing the relations between currents and voltages in the windings of the motor shown in Fig. 1 under different conditions of frequency.

Referring now to the drawings, M designates a motor having two windings, here shown as being an induction motor comprising two stator windings A and B, and a rotor C. The rotor C instead of being of the usual squirrel-cage type, comprises as here shown only a cylindrical shell of electro-conductive material, such as aluminum or copper. One of the windings A is connected directly across a source of alternating current E, and the other winding B is also connected across the source E but has in circuit with it a modifying means Z. As here shown, this means comprises a transformer T having its primary P connected in series with the winding B and its secondary S connected with a non-inductive resistance R.

The motor windings A and B and the modifying means Z may be so designed that when voltage of a certain predetermined frequency is supplied by transformer E, the currents in the windings A and B are substantially in phase and no torque is produced; but that when voltage of a higher frequency is impressed at transformer E, the power factor of the circuit of winding B is increased, and that of the circuit of winding A is slightly decreased, so that the currents in the two windings then differ in phase, and a torque is produced. For example, assume that it is desirable that the motor should have no torque at 25 cycles but should have torque at 60 cycles. The parts are then so designed that at 25 cycles the currents in the two windings are substantially in phase, as indicated by O—I $\frac{25}{A}$ and O—I $\frac{25}{B}$ in Fig. 2, wherein O—E represents the applied voltage. If now voltage at 60 cycles is impressed at E, the power factor of winding A decreases so that the angle of lag of the current in winding A increases as indicated by the line O—I $\frac{60}{A}$ in Fig. 2; the power factor of the circuit of winding B increases, however, so that the lag of the current in this winding decreases as indicated by line O—I $\frac{60}{B}$ in Fig. 2. The currents in windings A and B are therefore displaced in phase so that the motor then has torque.

The reason for the decrease of lag in winding B with increase of frequency is that the power factor of device Z increases with increase of frequency. It may be assumed for convenience that the ratio of transformation in transformer T is 1 to 1; this ratio will hold for all frequencies. The current flowing in primary P with R connected to S is found by combining in multiple the current which flows in P when S is on open circuit and a current equal in value but opposite in phase to the current taken from secondary S by resistance R. The transformer T is designed with an open magnetic circuit so that its open circuit current is of very low power factor and of such a magnitude as to form an important component of the total current flowing in P when R is connected to S. The current taken by R is of substantially unity power factor. At constant voltage across P the open circuit current taken by P varies almost inversely as the frequency but the current taken by S remains constant with change of frequency if the voltage does not change. It is therefore evident that the total current flowing in P consists of two components, a low power factor component to magnetize the core and a high power factor component to supply the current taken by R. Since the low power factor component is less on 60 cycles than on 25 cycles but the high power factor component remains constant, it follows that the total current taken at a given voltage on 60 cycles is of a higher power factor than the total current at the same voltage on 25 cycles. In other words, the impedance of device Z is of higher power factor on 60 cycles than on 25 cycles.

A motor embodying my invention may be advantageously employed as the actuating element of a relay; for example, the rotor C may actuate a contact 2 which is biased to the open position and is closed when the motor is energized by 60 cycle current. A relay of this character is particularly adapted for use as a track relay for signaling systems on railways employing alternating propulsion current. In such cases the frequency of the propulsion current is usually 25 cycles and that of the signaling current 60 cycles. It will be clear that with the particular adjustment hereinbefore mentioned, the relay will respond to the signaling current and not to the propulsion current.

One feature of a motor embodying my invention is that the breakage of any conductor associated with the modifying means Z will either cause the motor to become deënergized or will cause the motor to have torque in such direction as to hold contact 2 open. For example, if the circuit including resistance R and secondary winding S should become open while the motor is energized by 60 cycle current, the modifying means Z will become a mere reactance and the current in winding B will then lag behind that in winding A, so the rotor C will tend to rotate in such direction as to hold contact 2 open. Obviously, if the primary winding P should be opened, winding B would be deënergized and the action of gravity on contact 2 would hold it open.

Having thus described my invention, what I claim is:

1. In combination, a motor comprising two coacting windings, means for supplying alternating currents to said windings, and a modifying means associated with one of said windings and comprising a transformer whose primary is connected with the said winding and a resistance connected with the secondary of the transformer, said modifying means being so adjusted that at one frequency the power factors of the currents in the two windings are substantially equal and that at a higher frequency the power factor of the current in the winding having the modifying means is higher than the power factor of the current in the other winding.

2. In combination, a motor comprising two coacting windings, means for supplying alternating currents to said windings, and a modifying means associated with one of said windings and comprising a transformer whose primary is connected with the said winding and a resistance connected with the secondary of the transformer.

In testimony whereof I affix my signature in presence of two witnesses.

JOHN S. HOLLIDAY.

Witnesses:
R. HERMAN WEGNER.
R. L. KISTLER.